(12) United States Patent
Nadeau Beaulieu et al.

(10) Patent No.: US 11,935,433 B2
(45) Date of Patent: Mar. 19, 2024

(54) METHOD AND SYSTEM FOR CALCULATING A WIND ATTENUATION CAUSED BY AN OBSTACLE IN A SIMULATION

(71) Applicant: CAE INC., Saint-Laurent (CA)

(72) Inventors: Michel Nadeau Beaulieu, Saint-Laurent (CA); Jean Tardif, Saint-Laurent (CA)

(73) Assignee: CAE INC., Saint-Laurent (CA)

( * ) Notice: Subject to any disclaimer, the term of this patent is extended or adjusted under 35 U.S.C. 154(b) by 605 days.

(21) Appl. No.: 15/939,915

(22) Filed: Mar. 29, 2018

(65) Prior Publication Data

US 2019/0304323 A1 Oct. 3, 2019

(51) Int. Cl.
*G09B 9/06* (2006.01)
*G09B 9/20* (2006.01)
*G09B 9/30* (2006.01)
*G09B 9/46* (2006.01)

(52) U.S. Cl.
CPC ............ *G09B 9/206* (2013.01); *G09B 9/302* (2013.01); *G09B 9/46* (2013.01)

(58) Field of Classification Search
CPC ........... G09B 9/206; G09B 9/302; G09B 9/46
USPC .......................................................... 703/8
See application file for complete search history.

(56) References Cited

U.S. PATENT DOCUMENTS

| 9,489,858 | B2 | 11/2016 | Mengotti et al. |
| 10,473,761 | B2 * | 11/2019 | Slapak ................ G01S 13/4454 |
| 2007/0236367 | A1 * | 10/2007 | Matayoshi .............. G01S 17/58 340/973 |

OTHER PUBLICATIONS

Chirico_2017 (Numerical Modelling of the Aerodynamic Interference between Helicopter and ground obstacles, CEAS Aeronaut J (2017)). (Year: 2017).*
Sjoholm_2013 (Two-Dimensional Rotorcraft Downwash Flow Field Measurements by Lidar-Based Wind Scanners with Agile Beam Steering, Journal of Atmospheric and Ocean Technology vol. 31 ISARS 2012) (Year: 2012).*
Schlipf_2009 (Development of a Wind Turbine LiDAR Simulator, Proc. EWEC, 2009) (Year: 2009).*

(Continued)

*Primary Examiner* — Brian S Cook
(74) *Attorney, Agent, or Firm* — Fasken Martineau DuMoulin, LLP; Serge Lapointe

(57) ABSTRACT

A method for determining an attenuation of a wind caused by a simulated obstacle and experienced by a simulated vehicle in a simulation, comprising: receiving a wind direction and an initial speed for a simulated wind; generating a line of sight vector having a source position, a given direction and a given length, the given direction being one of opposite to the wind direction and identical to the wind direction; determining a distance between the simulated obstacle and the simulated vehicle using the line of sight vector, the distance being at most equal to the given length of the line of sight vector; determining a wind attenuation gain using the distance between the simulated obstacle and the simulated vehicle; determining an actual speed for the simulated wind using the initial speed of the simulated wind and the gain for the wind attenuation; and outputting the actual speed.

20 Claims, 4 Drawing Sheets

(56) References Cited

OTHER PUBLICATIONS

Mikkelsen_2017 (3D WindScanner Lidar Measurement of Wind and Turbulence Around Wind Turbines, Buildings and Bridges, First Conference of Computational Methods in Offshore Technology (COTech2017), 2017) (Year: 2017).*

Sabatini_2013 (Development and Flight Test of an Avionics lidar for helicopter and UAV low-level flight, J Aeronaut Aerospace Eng 2013, 2:3). (Year: 2013).*

Rao_2006 (Ground Surface Extraction from Side-Scan (Vehicular) LIDAR MAPPS/ASPRS 2006 Fall Conference Nov. 6-10, 2006 San Antonio Texas). (Year: 2006).*

Siciliano_2008 (Springer Handbook of Robotics 2008) (Year: 2008).*

Hofle_2016 (HELIOS: a Multi-purpose LIDAR simulation framework for research, planning, and training of laser scanning operations with airborne ground-based mobile and stationary platforms, ISPRS annals of the photogrammetry, remote sensing and spatial sciences, vol. iii-3, 2016). (Year: 2016).*

"An investigation of coupling ship/rotor flowfield using steady and unsteady rotor methods" Engineering Applications of Computational Fluid Mechanics, vol. 11, No. 1, 417-434, https://doi.org/10.1080/19942060.2017.1308272, Yongjie Shi et al.

"Computational Investigation of Micro Helicopter Near-Wall Effect", 19th Australasian Fluid Mechanics Conference, Melbourne, Australia, Dec. 8-11, 2014, D. C. Robinson et al.

"Helicopter Wakes Models in the Presence of Ground Obstacles", Garteur TP-174, Antonio Filippone et al., Apr. 2012.

"Realistic training for extreme flight conditions", Technical University of Munich (TUM), Dec. 27, 2016.

"Real-Time Simulation of Rotor Inflow Using a Coupled Flight Dynamics and Fluid Dynamics Simulation", Deutscher Luft- und Raumfahrtkongress 2016, J. Bludau et al.

* cited by examiner

METHOD AND SYSTEM FOR CALCULATING A WIND ATTENUATION CAUSED BY AN OBSTACLE IN A SIMULATION

TECHNICAL FIELD

The present invention relates to the field of vehicle simulators, and more particularly to the determination of the wind attenuation due to the proximity of obstacles.

BACKGROUND

The safe and efficient flight operation of modern helicopters has many demanding aspects for the crew and requires an extensive amount of training. This training on the actual aircraft can be costly, time consuming and involves a certain degree of risks. Flight simulators have been developed to alleviate some of these constraints and their level of fidelity has consistently improved over the years. In a typical training scenario, pilots who fly simulators can observe obstacles in the scene through a visual system. The latter is built based on databases that contain the topography of the terrain and physical structures such as buildings, walls, trees, bridges, etc. One challenge of creating a complete simulation is the interaction of the simulated aircraft with its simulated environment represented through the visual system and the weather selected by the instructor (winds, turbulence, etc.). It is possible to have the weather interact with the visual system and the typical method used is to generate a series of computational fluid dynamics (CFD) solutions that pre-calculate the flow and turbulence fields around the various structures contained in the visual database. For example, CFD solutions may be used for determining the blockage of wind due to the presence of an obstacle between the wind origin and the simulated aircraft. However, although they may generate precise solutions, such CFD methods are costly.

Therefore, there is a need for an improved method and system for determining wind attenuation caused by the proximity of obstacles in a simulation.

SUMMARY

According to a first broad aspect, there is provided a computer-implemented method for determining an attenuation of a wind caused by a simulated obstacle and experienced by a simulated vehicle in a simulation, comprising: receiving a wind direction and an initial speed for a simulated wind; generating a line of sight vector having a source position, a given direction and a given length, the given direction being one of opposite to the wind direction and identical to the wind direction; determining a distance between the simulated obstacle and the simulated vehicle using the line of sight vector, the distance being at most equal to the given length of the line of sight vector; determining a wind attenuation gain using the distance between the simulated obstacle and the simulated vehicle; determining an actual speed for the simulated wind using the initial speed of the simulated wind and the gain for the wind attenuation; and outputting the actual speed of the simulated wind.

In one embodiment, the source position of the line of sight vector is located on the simulated vehicle.

In one embodiment, the source position is located along an axis orthogonal to the wind direction.

In one embodiment, the axis passes by a reference point located on the simulated vehicle.

In one embodiment, the method further comprises varying the given direction between a first direction opposite to the wind direction and a second direction identical to the wind direction.

In the same or another embodiment, the method further comprises varying a position of the source position along the axis.

In one embodiment, said generating the line of sight vector comprises generating a plurality of line of sight vectors each having a respective source position located on the simulated vehicle, a respective direction and a respective length, the respective direction for each one of the plurality of line of sight vectors being one of opposite to the wind direction and identical to the wind direction.

In one embodiment, said determining the distance between the simulated obstacle and the simulated vehicle comprising determining a respective distance between each respective source position and the simulated obstacle.

In one embodiment, the respective length is identical for each one of the plurality of line of sight vectors.

In one embodiment, the respective source position is located along an axis orthogonal to the wind direction.

In one embodiment, the respective direction is substantially orthogonal to the axis.

In one embodiment, the respective direction is parallel to an Earth horizontal plane.

In one embodiment, the axis passes by a reference point located on the simulated vehicle.

In one embodiment, the respective source position of each one of the plurality of line of sight vectors is located along the axis.

In one embodiment, the respective source position of at least two of the plurality of line of sight vectors is identical, the respective direction for the at least two of the plurality of line of sight vectors being different.

In one embodiment, the respective source position of at least two of the plurality of line of sight vectors is different.

In one embodiment, said determining the distance between the simulated obstacle and the simulated vehicle comprises: accessing a visual database containing a topography of a simulated terrain and simulated physical structures; identifying the obstacle as being the closest object from the source position along the given direction, the closest object being one of a part of the simulated terrain and one of the simulated physical structures and a distance between the closest object and the source position being at most equal to the given length of the line of sight vector; and determining a distance between the source position and the closest object, thereby obtaining the distance between the simulated obstacle and the simulated vehicle.

According to another broad aspect, there is provided a system for determining an attenuation of a wind caused by a simulated obstacle and experienced by a simulated vehicle in a simulation, comprising: a communication unit for at least one of receiving and transmitting data, a memory and a processing unit configured for executing the steps of the above-described method.

According to a further broad aspect, there is provided a system for determining an attenuation of a wind caused by a simulated obstacle and experienced by a simulated vehicle in a simulation, comprising: receiving an initial speed for a simulated wind; a vector module configured for receiving a direction of a simulated wind and generating a line of sight vector having a source position, a given direction and a given length, the given direction being one of opposite to a wind direction and identical to the wind direction; a gain module configured for receiving a distance between the simulated obstacle and the simulated vehicle using the line of sight vector and determining a wind attenuation gain using the distance between the simulated obstacle and the simulated vehicle, the distance being at most equal to the given length of the line of sight vector; and a speed module configured for determining an actual speed for the simulated wind using the initial speed of the simulated wind and the wind attenuation gain and outputting the actual speed of the simulated wind.

In one embodiment, the system further comprises a distance module configured for determining the distance between the simulated obstacle and the simulated vehicle using the line of sight vector.

In one embodiment, the source position of the line of sight vector is located on the simulated vehicle.

In one embodiment, the source position is located along an axis orthogonal to the wind direction.

In one embodiment, the axis passes by a reference point located on the simulated vehicle.

In one embodiment, the vector module is further configured for varying the given direction between a first direction opposite to the wind direction and a second direction identical to the wind direction.

In the same or another embodiment, the vector module is further configured for varying a position of the source position along the axis.

In one embodiment, the vector module is configured for generating a plurality of line of sight vectors each having a respective source position located on the simulated vehicle, a respective direction and a respective length, the respective direction for each one of the plurality of line of sight vectors being one of opposite to the wind direction and identical to the wind direction.

In one embodiment, the distance module is configured for determining a respective distance between each respective source position and the simulated obstacle.

In one embodiment, the respective length is identical for each one of the plurality of line of sight vectors.

In one embodiment, the respective source position is located along an axis orthogonal to the wind direction.

In one embodiment, the respective direction is substantially orthogonal to the axis.

In one embodiment, the respective direction is parallel to an Earth horizontal plane.

In one embodiment, the axis passes by a reference point located on the simulated vehicle.

In one embodiment, the respective source position of each one of the plurality of line of sight vectors is located along the axis.

In one embodiment, the respective source position of at least two of the plurality of line of sight vectors is identical, the respective direction for the at least two of the plurality of line of sight vectors being different.

In one embodiment, the respective source position of at least two of the plurality of line of sight vectors is different.

In one embodiment, the distance module is configured for: accessing a visual database containing a topography of a simulated terrain and simulated physical structures; identifying the obstacle as being the closest object from the source position along the given direction, the closest object being one of a part of the simulated terrain and one of the simulated physical structures and a distance between the closest object and the source positon being at most equal to the given length of the line of sight vector; and determining a distance between the source position and the closest object, thereby obtaining the distance between the simulated obstacle and the simulated vehicle.

BRIEF DESCRIPTION OF THE DRAWINGS

Further features and advantages of the present invention will become apparent from the following detailed description, taken in combination with the appended drawings, in which.

It will be noted that throughout the appended drawings, like features are identified by like reference numerals.

DETAILED DESCRIPTION

Figure 1:
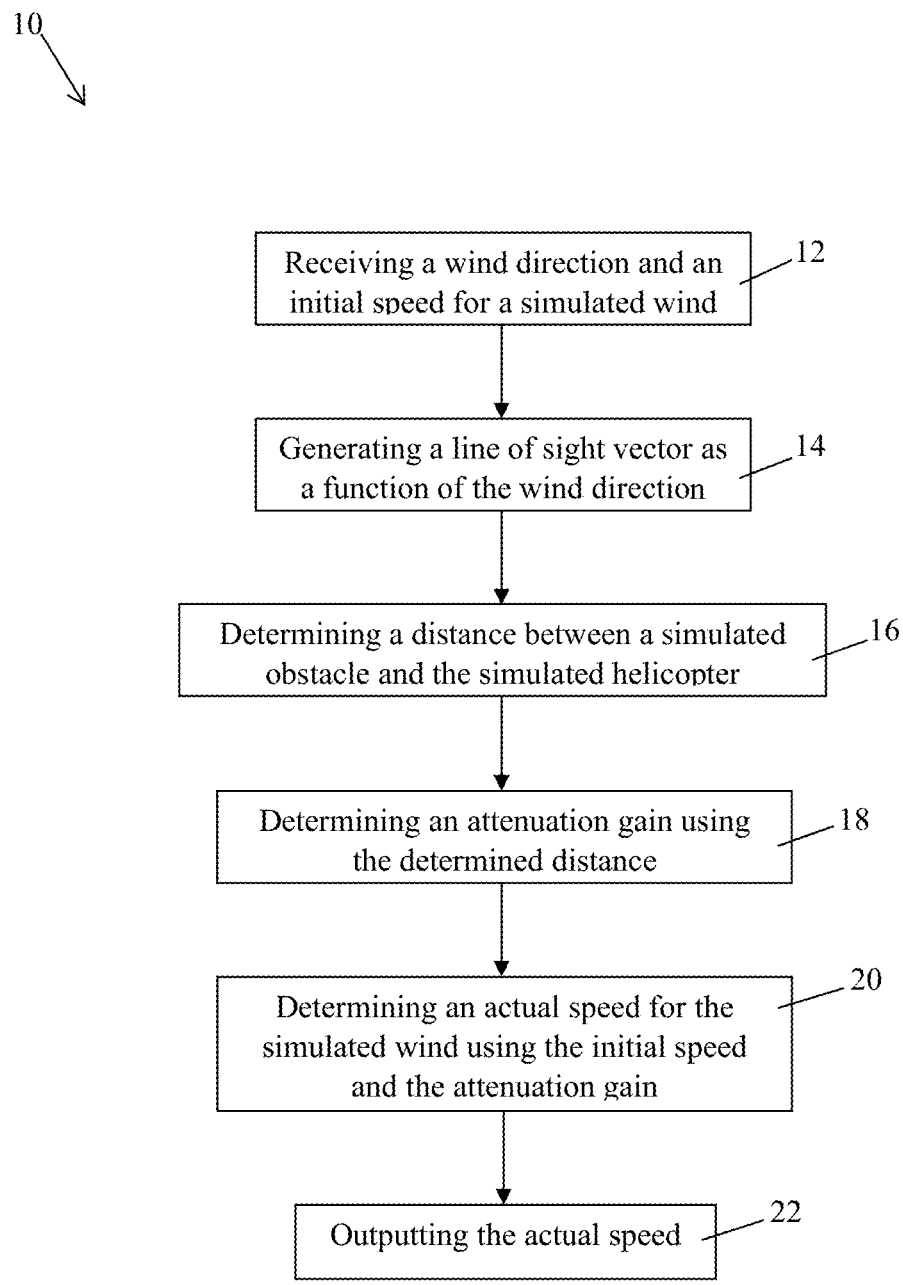
FIG. 1 is a flow chart of a method for determining the attenuation of the wind speed due to an obstacle, in accordance with an embodiment.

FIG. 1 illustrates a computer implemented method for calculating the wind attenuation caused by an obstacle in a simulation. The method 10 is performed by a computer machine provided with communication means, a processing unit and a memory.

The simulation is configured for training a user to use a vehicle. An image of an outdoor is displayed on a display and the displayed image may correspond to what would be seen by the user if he would be within a real vehicle. For example, the vehicle may be a rotor aircraft such as a helicopter, a cyclogyro, a cyclocopter, an autogyro, a gyrodyne, a rotor bike, or the like. While in the below description, reference is made to a helicopter, it should be understood that the method 10 may be used for any adequate simulated vehicle or entity such as a plane, a tank, a bicycle, a human, etc.

The simulator used for providing the simulation to the user comprises at least a display on which the simulated images are to be displayed, instruments for allowing the user to control the simulated vehicle and a simulation engine configured for generating the simulation using the commands received from the instruments and displaying the simulation images on the display. The simulator further comprises a database having stored thereon at least topography information about the simulated terrain and simulated structures such as buildings, walls, trees, bridges, and moving entities such as landable ships, and/or the like. For example, the database may contain information such as the position information, dimension information, information about the material from which a structure is made, and/or the like.

At step 12, information about the wind is received. The information comprises the direction of the wind and its initial speed or flow velocity. In one embodiment, the information about the wind is sent by the simulation engine and this information may be stored in the database along with other information such as the topography information. In one embodiment, the method 10 may further comprise a step of sending a request for information about the wind to the simulation engine. In this case, the simulation engine transmits the information about the wind upon receipt of the request.

At step 14, a line of sight vector is generated using the received wind direction. A line of sight vector is defined by a source position, a direction and a length. The source position may be located on the simulated helicopter. In another embodiment, the source position may be adjacent to the simulated helicopter. The direction of the line of sight vector is chosen to be either identical to the direction of the wind or opposite to the direction of the wind. The length of the line of sight vector defines the range for an obstacle to have an impact on the wind, i.e. the maximum distance for an obstacle to create wind attenuation for the simulated helicopter. As a result, if no obstacle is present over a distance equal to the length of the line of sight vector, then there is no attenuation for the wind. However, if an obstacle is present at a distance from the source position shorter or equal to the length of the line of sight vector, then the wind is attenuated for the simulated helicopter.

At step 16, it is determined whether an obstacle is present along the line of sight vector generated at step 14. To do so, the distance between the source position and the closest obstacle from the source position along the direction of the line of sight is calculated using the topography information contained in the database. If no obstacle is present, i.e. if the distance between the closest obstacle from the source position along the direction of the line of sight is greater than the length of the line of sight, then no attenuation for the wind is calculated. On the other end, if the presence of an obstacle is detected, i.e. if the distance between the closest obstacle from the source position along the direction of the line of sight is less than or equal to the length of the line of sight, then an attenuation for the wind is to be calculated and steps 18-22 are performed.

It should be understood that an obstacle may correspond to a part of the simulated terrain stored in the database such as a hill and/or a simulated structure such as a building or a landable ship.

It should also be understood that if more than one obstacle is identified as having a position within the range defined by the length of the line of sight vector, only the obstacle being the closest form the source position is considered and the distance determined at step 16 corresponds to the distance between the source position and the closest obstacle from the source position.

At step 18, an attenuation gain for the wind is calculated using the determined distance between the source position of the line of sight vector and the identified closest obstacle. In one embodiment, the shortest the distance between the source position and the closest obstacle is, the greater the wind attenuation gain is.

At step 20, the actual or attenuated speed for the wind is calculated using the initial speed of the wind received at step 12 and the gain attenuation calculated at step 18. In one embodiment, the attenuated speed of the wind is obtained by multiplying the initial speed by the calculated attenuation gain.

Finally, the attenuated speed of the wind is outputted. In one embodiment, the attenuated speed is stored in memory. In the same or another embodiment, the attenuated speed is sent to the simulation engine which uses the attenuated speed for controlling the simulated helicopter.

In one embodiment, the method 10 is executed in substantially real-time while the user interacts with the simulator to provide the user with a real-time effect of the wind on the simulated helicopter.

In one embodiment, the step 16 comprises sending to the simulation engine a request for receiving the distance of the closest obstacle from the source position of the line of sight vector. In this case, the request comprises at least the source position and the direction of the line of sight vector. The simulation engine receives the request and determines the distance of the closest obstacle from the source position along the direction of the line of sight vector. In one embodiment, the simulation engine transmits the determined distance to the computer machine that executes the method 10 and the computer machine compares the received distance to the length of the line of sight vector. If the distance is greater than the length of the line of sight vector, the computer machine calculates no attenuation gain for the wind. However, if the received distance is less than or equal to the length of the line of sight vector, the computer machine performs the steps 18-22 of the method 10 using the received distance. In an embodiment in which the request further comprises the length of the line of sight vector, the simulation engine may be further configured for comparing the determined distance to the length of the line of sight vector and transmits the determined distance to the computer machine only when it is less than or equal to the length of the line of sight vector.

In one embodiment, the method 10 further comprises iteratively varying the direction of the line of sight vector between a first direction opposite to the direction of the wind and a second direction corresponding to that of the wind. In this case, the closest obstacle is identified for both the first and second directions and the distance to the closest obstacle is determined for both the first and second directions at step 16. An attenuation gain is calculated at step 18 for both the first and second directions using the respective distance to the closest obstacle. The attenuated speed of the wind is then calculated at step 20 using the attenuation gain for the first direction and the attenuation gain for the second direction. For example, the attenuated speed may be obtained by the multiplying the initial speed of the wind by the two attenuation gains obtained for both the first and second directions.

In one embodiment, the method 10 further comprises varying the source position of the line of sight vector and performing the steps 16-22 for each possible position for the line of sight vector. It should be understood that the variation of the source position may be combined with the above-described variation of the direction of the line of sight vector. For example, the line of sight vector when at a first source position may have the same direction as that of the wind and have a direction opposite to that of the wind when the source position is at a second and different position. In another example, the source position may be set at a first position and the direction of the line of sight vector may be first set to correspond to that of the wind and then changed to be opposite to the direction of the wind. Then the source position of the line of sight vector is changed to a second and different position and the direction of the line of sight vector is also changed to iteratively occupy the two directions, i.e. the same direction as that of the wind and the direction opposite to that of the wind.

In one embodiment, the different source positions for the line of sight vector may be chosen to be on the simulated vehicle, i.e. on the simulated helicopter. The source positions may be chosen to each correspond to a main component of the simulated helicopter.

In one embodiment, the different source positions are located within the azimuth plane of the simulated helicopter. For example, the source positions may be aligned along an axis contained within the azimuth plane of the simulated helicopter. In another embodiment, the different source positions are located within the altitude plane of the simulated helicopter. For example, the source positions may be aligned along an axis contained within the altitude plane of the simulated helicopter.

In one embodiment, the generated line of sigh vector(s) is (are) parallel to the Earth horizontal plane.

It should be understood that the source positions may be chosen to cover different points of the simulated helicopter along the longitudinal axis of the simulated helicopter from its front end to its rear end for example, and/or on different points positioned on the main rotor of the simulated helicopter for example, and/or different points of the simulated helicopter along its vertical axis from its top to its bottom for example.

In one embodiment, the different source positions are aligned along an interrogation axis 38 which is chosen to be orthogonal to the wind direction 39 as illustrated in FIG. 2. In the illustrated embodiment, a simulated helicopter 40 is present between a first obstacle 42 and a second obstacle 44 so that the first obstacle 42 be positioned between the wind source and the simulated helicopter 40 and the simulated helicopter 40 be positioned between the first and second obstacles 42 and 44. The first obstacle 42 is said to be positioned upstream from the simulated helicopter 40 relative to the wind 39 while the second obstacle 44 is said to be positioned downstream the wind 39 relative to the simulated helicopter 40.

The interrogation axis 38 is be chosen to be contained within the azimuth plane of the simulated helicopter 40 and passes by a reference point of the simulated helicopter such as a point belonging to the rotation axis of the main rotor of the simulated helicopter 40. Furthermore, and as mentioned above, the interrogation axis 38 is orthogonal to the wind direction 39. In the illustrated example, eight different source points 50-64 each corresponding to a source position for the line of sight vector are chosen along the interrogation axis 38 to cover the whole projection of the simulated helicopter 40 on the interrogation axis 38. The first source point 50 is chosen along the interrogation axis 38 so as to correspond to the projection of most-front point of the simulated helicopter 40 on the interrogation axis 38. The last source point 64 is chosen along the interrogation axis 38 so as to correspond to the projection of most-rear point of the simulated helicopter 40 on the interrogation axis 38. The source points 52-62 are optionally evenly distributed between the points 50 and 64. In another embodiment, the source points 52-62 may be distributed along the interrogation axis so that to correspond to the position of a main component of the simulated helicopter 40.

Figures 2A, 2B:
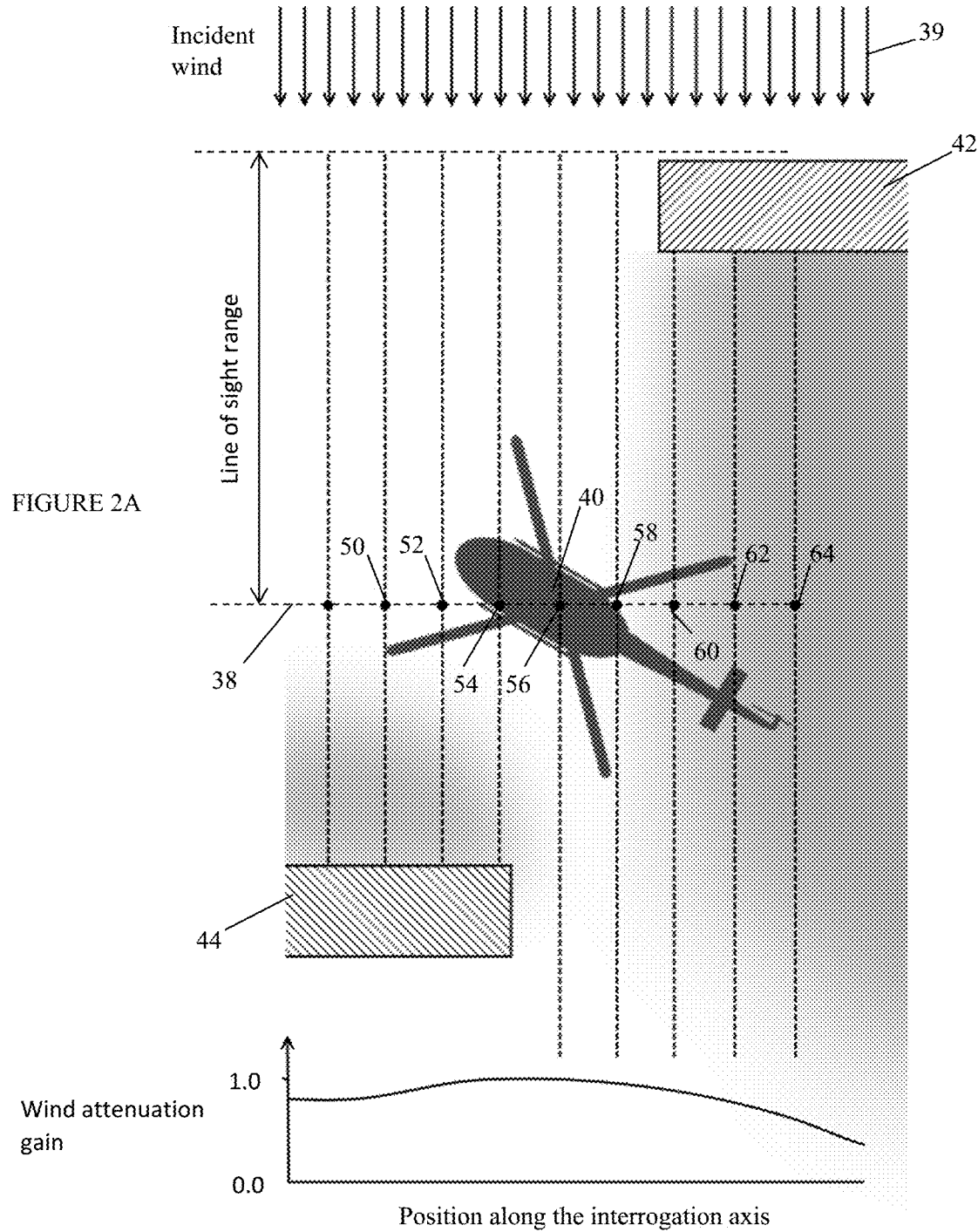
FIG. 2A illustrates a wind direction when a helicopter is partially located between two obstacles, in accordance with an embodiment.
FIG. 2B is an exemplary graph of a wind gain attenuation as a function of a position along an axis.

The source position of the line of sight vector is iteratively changed from the first source point 50 to the last interrogation point 64 and for each source point 50-64, the direction of line of sight vector is set to be first opposite to the wind direction 39 and then identical to the wind direction 39. For each source point 50-64 and each direction of line of sight vector, the steps 16 and 18 of the method 10 are performed so as to determine the wind attenuation gain for each source point 50-64 and each direction of line of sight vector. For each source point 50-64, a global attenuation gain is obtained by multiplying together the attenuation gains for the two line of sight vector directions. The resulting global attenuation gain as a function of the position of the source point position along the interrogation axis 38 is illustrated in FIG. 2B. For each source point 50-64, the attenuated wind speed is determined using the initial wind speed and the respective global attenuation gain, i.e. by multiplying the initial speed by the respective global attenuation gain.

Referring to FIG. 2A, even if the source positions 50-54 and 58-64 are not located on the simulated helicopter 40, the attenuated wind determined for each one of these points is associated with at least one point on the helicopter of which the projection corresponds to at least one of the source positions 50-54 and 58-64. These associations can be determined using any adequate geometric interpolation method.

While in the above description, there is described that a single line of sight vector is generated at step 14, it should be understood that a plurality of line of sight vectors may be generated at step 14. In this case, each one of the plurality of line of sight vectors has a respective and different source position and/or a respective and different direction. In this case, for each line of sight vector, the respective distance from the closest obstacle is determined at step 16 and the respective gain attenuation is determined at step 18. For each source position, the global attenuation gain is calculated by combining together the attenuation gain for the line of sight vector having the source position and the same direction as that of the wind and the attenuation gain for the line of sight having the same source position and the direction opposite to that of the wind, i.e. by multiplying together the two attenuation gains obtained for the same source position. At step 20, the attenuated wind speed is determined for each source position using the initial wind speed and the respective global attenuation gain.

Referring to FIG. 2A, a line of sight vector may be concurrently generated for each source point 50-64 and each of the two possible directions. In this case, 16 line of sight vectors are concurrently generated. A first set of line of sight vectors is generated for each source position 50-64 and each line of sight vector contained in the first set has a direction opposite to that of the wind. A second set of line of sight vectors is generated for each source position 50-64 and each line of sight vector contained in the second set has the same direction as that of the wind. The distance from the closest obstacle and the attenuation gain is concurrently determined for each one of the 16 line of sight vectors and the global attenuation gain is concurrently determined for each one of the 8 source positions 50-64.

In one embodiment, the different line of sigh vectors may each have a source point located on the simulated helicopter. In another embodiment, at least one of the line of sight vectors has a source position located on the simulated helicopter.

In one embodiment, the source position for the different line of sight vectors are positioned along an interrogation axis which is chosen to be orthogonal to the direction of the wind, as described above. In one embodiment, the interrogation axis intersects the helicopter, as described above.

Figure 3:
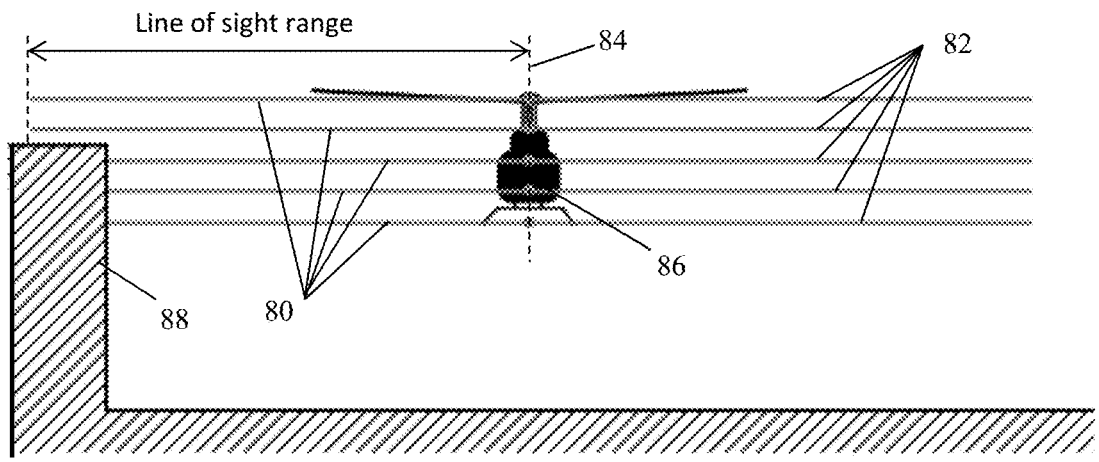
FIG. 3 illustrates the generation of a plurality of line of sight vectors having their source position located along the rotation axis of the main rotor of a simulated helicopter, in accordance with an embodiment.

While in FIG. 2A the different source positions are located along an interrogation axis 38 contained within the azimuth plane of the simulated helicopter 40, FIG. 3 illustrates an embodiment in which the line of sight vectors 80 and 82 each have a source position located along an interrogation axis 84 orthogonal to the wind direction and contained in the altitude plane of the simulated helicopter 86. In this illustrated embodiment, five source positions are defined along the interrogation axis 84 which is chosen to correspond to the rotation axis of the main rotor of the simulated helicopter 86. The five line of sight vectors 80 each have the same first direction such as a direction opposite to that of the wind and each have a source position that corresponds to a respective one of the five source points located along the rotation axis 84 of the simulated helicopter 86. The five line of sight vectors 82 each have the same second direction which is opposite to the first and each have a source position that corresponds to a respective one of the five source points located along the rotation axis 84 of the simulated helicopter 86. In the illustrated embodiment, the three bottom-most line of sight vectors 80 allow the detection of an obstacle 88.

In one embodiment, a single line of sight is generated and its source position and its direction are iteratively changed so that the source position of the single line of sight iteratively occupies each one of the five source positions located on the rotation axis 86 so that the five line of sight vectors 80 and the five line of sight vectors 82 be iteratively and successively generated. For example, the source position and/or the direction of the single line of sight vector may be changed at each simulation step.

In another embodiment, the five line of sight 80 and the five line of sight vectors 82 are concurrently generated.

In one embodiment, the distance to the obstacle used for the determination of the attenuation gain may correspond to the average distance obtained from the particular distances obtained using a plurality of line of sight having the same direction but a different source position. For example, and referring to FIG. 3, the distances to the obstacle 88 determined using three bottom-most line of sight vectors 80 can be averaged to provide the distance to be used in the calculation of the attenuation gain.

In one embodiment, the attenuation gain is normalized so that it may only have a value comprised between 0 and 1.

In the following, there is described one exemplary method for calculating the attenuation gain. For each source position such as each point of interest on the helicopter, the attenuation gain applied on the initial wind is defined by the following equation:

$$G_i(d_i) = \min\left(\max\left(\frac{d_i - D_{Min}}{D_{Max} - D_{Min}}, 0.0\right), 1.0\right) \cdot (1.0 - G_{Min}) + G_{Min}$$

where:
$G_i(d_i)$ is the wind attenuation gain applied on a source position i as a function of its distance $d_i$ from the obstacle;
$d_i$ is the distance between a source position i and an obstacle;
$G_{Min}$ is the minimum wind attenuation gain corresponding to a maximum blockage effect;
$D_{Min}$ is the minimum obstacle distance where a full wind blockage occurs and the gain $G_i(d_i)$ is equal to $G_{Min}$; and
$D_{Max}$ is the maximum obstacle distance where no blockage occurs and the gain $G_i(d_i)$ is equal to 1.0.

This equation applies for obstacles located both upstream and downstream the sources positions and it should be understood that the value of the parameters defined above may vary from one source point to another.

The global gain $G_i(d_i)_{final}$ is computed by combining the two directions as follows:

$$G_i(d_i)_{final} = G_i(d_i)_{upstream} \cdot G_i(d_i)_{downstream}$$

It should be understood that other models may be used for calculating the attenuation gain using the distance to the closest obstacle.

It should be understood that the method 10 may be embodied as a computer machine comprising at least one processing unit or processor, a communication unit and a memory having stored thereon statements and/or instructions that, when executed by the processing unit, executes the steps of the above-described method.

Figure 4:
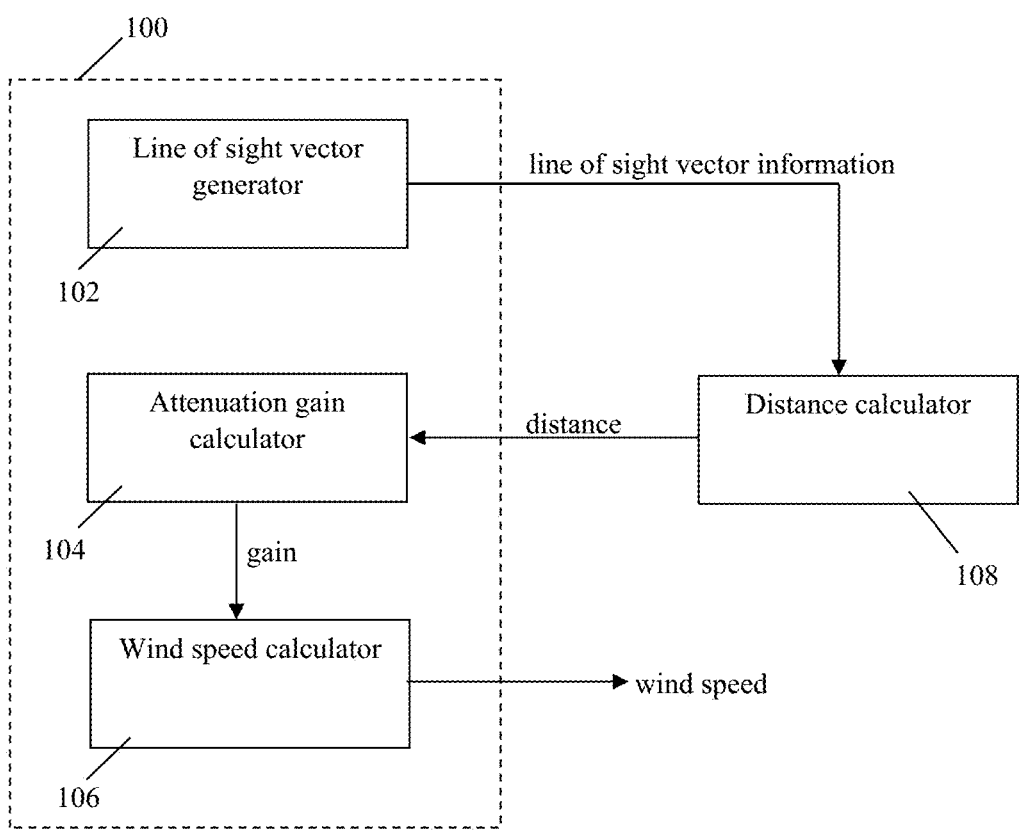
FIG. 4 is a block diagram illustrating a system for determining the attenuation of the wind speed due to an obstacle, in accordance with an embodiment.

FIG. 4 illustrates one embodiment of a system 100 for calculating the wind attenuation for a simulated vehicle caused by a simulated obstacle. The system 100 comprises a line of sight vector generator 102, an attenuation gain calculator 104 and a wind speed calculator 106. The line of sight vector generator 102 is configured for generating at least one line of sight vector as described above. In one embodiment, the line of sight vector generator 102 is configured for generating a single line of sight vector and varying the source position and/or the direction of the single line of sight vector. In another embodiment, the line of sight vector generator 102 is configured for generating a plurality of line of sight vectors each having a different direction and/or a different source position.

The line of sight vector generator 102 is further configured for transmitting information about the generated line of sight vector to a distance calculator 108. The transmitted information contains at least the source position and the direction of the line of sight vector, for each generated line of sight vector. The distance calculator 108 is configured for calculating the distance between the source position and the closest obstacle along the direction and transmitting the calculated distance to the attenuation gain calculator 104, for each line of sight vector.

In one embodiment, the line of sight vector generator 102 may further transmit the length of the line of sight vector to the distance calculator 108. In this case, the distance calculator 108 may be configured for comparing the determined distance to the length of the line of sight vector and transmit the determined distance to the attenuation gain calculator 104 only when the determined distance is less than or equal to the length of the line of sight vector. It should be understood that, if the attenuation gain calculator 104 receives no distance from the distance calculator 108, then the attenuation gain calculator 104 calculates no attenuation gain.

In another embodiment, the line of sight vector generator 102 may further be configured for transmitting the length of the line of sight vector to the attenuation gain calculator 104. In this case, the attenuation gain calculator 104 may be configured for comparing together the determined distance received from the distance calculator 108 and the received length of the line of sight vector and calculating the attenuation gain only when the distance received form the distance calculator 108 is less than or equal to the length of the line of sight vector.

For each line of sight vector, the attenuation gain calculator 104 is configured for calculating the attenuation gain using the respective distance received from the distance calculator 108, as described above. The attenuation gain calculator 104 is further configured for transmitting the calculated attenuation gain to the wind speed calculator 106 which determines the wind speed as experienced by the simulated helicopter using the initial wind speed and the attenuation gain, as described above.

In one embodiment, the distance calculator 108 is separate from the system 100. In this case, the distance calculator 108 may be the simulation engine configured for generating the simulation of the helicopter.

In another embodiment, the distance calculator 108 is part of the system 100.

In one embodiment, each one of the modules 102-108 is provided with a respective processing unit such as a micro-processor, a respective memory and respective communication means. In another embodiment, at least two of the modules 102-108 may share a same processing unit, a same memory and/or same communication means. For example, the system 100 may comprise a single processing unit used by each module 102-106, a single memory and a single communication unit.

Figure 5:
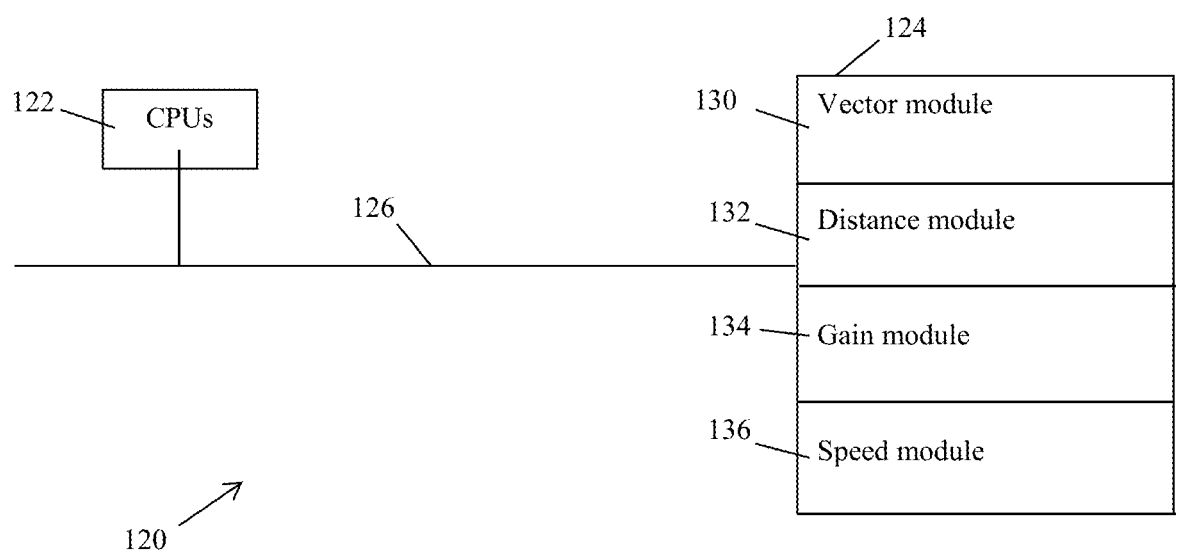
FIG. 5 is a block diagram of a processing module adapted to execute at least some of the steps of the method of FIG. 1, in accordance with an embodiment.

FIG. 5 is a block diagram illustrating an exemplary processing module 120 for executing the steps 12 to 22 of the method 10, in accordance with some embodiments. The processing module 120 typically includes one or more Computer Processing Units (CPUs) and/or Graphic Processing Units (GPUs) 122 for executing modules or programs and/or instructions stored in memory 124 and thereby performing processing operations, memory 124, and one or more communication buses 126 for interconnecting these components. The communication buses 126 optionally include circuitry (sometimes called a chipset) that interconnects and controls communications between system components. The memory 124 includes high-speed random access memory, such as DRAM, SRAM, DDR RAM or other random access solid state memory devices, and may include non-volatile memory, such as one or more magnetic disk storage devices, optical disk storage devices, flash memory devices, or other non-volatile solid state storage devices. The memory 124 optionally includes one or more storage devices remotely located from the CPU(s) 122. The memory 124, or alternately the non-volatile memory device(s) within the memory 124, comprises a non-transitory computer readable storage medium. In some embodiments, the memory 124, or the computer readable storage medium of the memory 84 stores the following programs, modules, and data structures, or a subset thereof:

- a vector module 130 for generating at least one line of sight vector;
- a distance module 132 for calculating the distance between the source position of the line of sight vector and the closest obstacle along the direction of the line of sight vector;
- a gain module 134 for calculating the attenuation gain using the calculated distance; and
- a speed module 136 for calculating the wind speed experienced by the simulated vehicle using the attenuation gain.

It should be understood that the distance module 132 may be omitted.

Each of the above identified elements may be stored in one or more of the previously mentioned memory devices, and corresponds to a set of instructions for performing a function described above. The above identified modules or programs (i.e., sets of instructions) need not be implemented as separate software programs, procedures or modules, and thus various subsets of these modules may be combined or otherwise re-arranged in various embodiments. In some embodiments, the memory 84 may store a subset of the modules and data structures identified above. Furthermore, the memory 84 may store additional modules and data structures not described above.

Although it shows a processing module 120, FIG. 5 is intended more as functional description of the various features which may be present in a management module than as a structural schematic of the embodiments described herein. In practice, and as recognized by those of ordinary skill in the art, items shown separately could be combined and some items could be separated.

The embodiments of the invention described above are intended to be exemplary only. The scope of the invention is therefore intended to be limited solely by the scope of the appended claims.

We claim:

1. A computer-implemented method for determining an attenuation of a wind caused by a simulated obstacle and experienced by a simulated vehicle in a simulation running on a simulation device, comprising:
   - receiving a wind direction and an initial speed for a simulated wind;
   - generating a line of sight vector based on the wind direction, the line of sight vector associated with the simulated vehicle and having a source position, a given direction and a given length, the given direction being one of opposite to the wind direction and identical to the wind direction, the source position being on the simulated vehicle, and a maximum distance for an obstacle to create wind attenuation for the simulated vehicle defining the given length of the line of sight vector;
   - determining that a simulated obstacle is present within a distance corresponding to the length of the line of sight vector;
   - calculating a wind attenuation gain using a distance between the simulated obstacle and the simulated vehicle;
   - calculating an actual speed for the simulated wind using the initial speed of the simulated wind and the wind attenuation gain; and
   - transmitting the actual speed of the simulated wind to a simulation engine associated with the simulation device, the simulation engine using the actual speed of the simulated wind to control the simulated vehicle.

2. The computer-implemented method of claim 1, wherein the source position of the line of sight vector is located on the simulated vehicle and along an axis orthogonal to the wind direction.

3. The computer-implemented method of claim 2, wherein the axis passes by a reference point located on the simulated vehicle.

4. The computer-implemented method of claim 2, further comprising varying at least one of a position of the source position along the axis and the given direction between a first direction opposite to the wind direction and a second direction identical to the wind direction.

5. The computer-implemented method of claim 1, wherein said generating the line of sight vector comprises generating a plurality of line of sight vectors each having a respective source position located on the simulated vehicle, a respective direction and a respective length, the respective direction for each one of the plurality of line of sight vectors being one of opposite to the wind direction and identical to the wind direction, and wherein said calculating the distance between the simulated obstacle and the simulated vehicle comprises calculating a respective distance between each respective source position and the simulated obstacle.

6. The computer-implemented method of claim 5, wherein the respective length is identical for each one of the plurality of line of sight vectors.

7. The computer-implemented method of claim 5, wherein the respective source position is located along an axis orthogonal to the wind direction.

8. The computer-implemented method of claim 7, wherein the respective direction is one of substantially orthogonal to the axis and parallel to an Earth horizontal plane.

9. The computer-implemented method of claim 1, further comprising calculating the distance between the simulated obstacle and the simulated vehicle, said calculating the distance between the simulated obstacle and the simulated vehicle comprising:
   accessing a visual database containing a topography of a simulated terrain and simulated physical structures;
   identifying the simulated obstacle as being the closest object from the source position along the given direction, the closest object being one of a part of the simulated terrain and one of the simulated physical structures and a distance between the closest object and the source position being at most equal to the given length of the line of sight vector; and
   determining a distance between the source position and the closest object, thereby obtaining the distance between the simulated obstacle and the simulated vehicle.

10. A system for determining an attenuation of a wind caused by a simulated obstacle and experienced by a simulated vehicle in a simulation running on a simulation device, comprising:
   a vector module configured for receiving a direction of a simulated wind and generating a line of sight vector based on the wind direction, the line of sight vector having a source position, a given direction and a given length, the given direction being one of opposite to a wind direction and identical to the wind direction, the source position being on the simulated vehicle, and a maximum distance for an obstacle to create wind attenuation for the simulated vehicle defining the given length of the line of sight vector;
   a distance module configured for determining that a simulated obstacle is present within a distance corresponding to the length of the line of sight vector;
   a gain module configured for receiving a distance between the simulated obstacle and the simulated vehicle using the line of sight vector and calculating a wind attenuation gain using the distance between the simulated obstacle and the simulated vehicle, the distance being at most equal to the given length of the line of sight vector; and
   a speed module configured for receiving an initial speed for a simulated wind, calculating an actual speed for the simulated wind using the initial speed of the simulated wind and the wind attenuation gain and transmitting the actual speed of the simulated wind to a simulation engine associated with the simulation device, the simulation engine using the actual speed of the simulated wind to control the simulated vehicle.

11. The system of claim 10, wherein the distance module is configured for:
   identifying the closest object from the simulated vehicle;
   comparing a distance between the closest object and the simulated vehicle to the given length of the line of sight vector; and
   if the distance between the closest object and the simulated vehicle is at most equal to the given length of the line of sight vector, identifying the closest object as being the simulated obstacle.

12. The system of claim 10, wherein the source position of the line of sight vector is located on the simulated vehicle and along an axis orthogonal to the wind direction.

13. The system of claim 12, wherein the axis passes by a reference point located on the simulated vehicle.

14. The system of claim 12, wherein the vector module is further configured for varying at least one of a position of the source position along the axis and the given direction between a first direction opposite to the wind direction and a second direction identical to the wind direction.

15. The system of claim 10, wherein the vector module is configured for generating a plurality of line of sight vectors each having a respective source position located on the simulated vehicle, a respective direction and a respective length, the respective direction for each one of the plurality of line of sight vectors being one of opposite to the wind direction and identical to the wind direction, and wherein the distance module is configured for calculating a respective distance between each respective source position and the simulated obstacle.

16. The system of claim 15, wherein the respective length is identical for each one of the plurality of line of sight vectors.

17. The system of claim 15, wherein the respective source position is located along an axis orthogonal to the wind direction.

18. The system of claim 10, wherein the distance module is further configured for calculating the distance between the simulated obstacle and the simulated vehicle by:
   accessing a visual database containing a topography of a simulated terrain and simulated physical structures;
   identifying the obstacle as being the closest object from the source position along the given direction, the closest object being one of a part of the simulated terrain and one of the simulated physical structures and a distance between the closest object and the source position being at most equal to the given length of the line of sight vector; and
   determining a distance between the source position and the closest object, thereby obtaining the distance between the simulated obstacle and the simulated vehicle.

19. The computer-implemented method of claim 1, wherein said determining that the simulated obstacle is present comprises:
   identifying a closest object from the simulated vehicle;
   comparing a distance between the closest object and the simulated vehicle to the given length of the line of sight vector;
   if the distance between the closest object and the simulated vehicle is at most equal to the given length of the line of sight vector, identifying the closest object as being the simulated obstacle.

20. A non-transitory computer readable memory storing computer executable instructions thereon that when executed by a computer perform the method steps of:
   receiving a wind direction and an initial speed for a simulated wind;
   generating a line of sight vector based on the wind direction, the line of sight vector associated with the simulated vehicle and having a source position, a given direction and a given length, the given direction being one of opposite to the wind direction and identical to the wind direction, the source position being on the simulated vehicle, and a maximum distance for an obstacle to create wind attenuation for the simulated vehicle defining the given length of the line of sight vector;
   determining that a simulated obstacle is present within a distance corresponding to the length of the line of sight vector;
   calculating a wind attenuation gain using a distance between the simulated obstacle and the simulated vehicle;

calculating an actual speed for the simulated wind using the initial speed of the simulated wind and the wind attenuation gain; and transmitting the actual speed of the simulated wind to a simulation engine associated with the simulation device, the simulation engine using the actual speed of the simulated wind to control the simulated vehicle.

\* \* \* \* \*